United States Patent [19]

Kawamata

[11] Patent Number: 4,577,077
[45] Date of Patent: Mar. 18, 1986

[54] SURFACE SMOOTHING METHOD FOR DISK-LIKE RECORDING MEDIUM

[75] Inventor: Toshio Kawamata, Odawara, Japan

[73] Assignee: Fuji Photo Film Co., Ltd., Japan

[21] Appl. No.: 517,282

[22] Filed: Jul. 26, 1983

[30] Foreign Application Priority Data

Aug. 12, 1982 [JP] Japan .................................. 57-140167

[51] Int. Cl.[4] ............................................. H05B 6/64
[52] U.S. Cl. .............................. 219/10.43; 219/10.81; 219/10.57; 219/464; 427/45.1; 427/130
[58] Field of Search ............... 219/10.41, 10.43, 10.81, 219/10.57, 10.53, 450, 464, 481, 549; 427/45.1, 130, 46

[56] References Cited

U.S. PATENT DOCUMENTS

| | | | |
|---|---|---|---|
| 2,449,318 | 9/1948 | Pitman et al. | 219/10.81 |
| 3,783,217 | 1/1974 | Brown | 219/10.53 |
| 4,342,895 | 8/1982 | Krishnakumar et al. | 219/10.43 |

FOREIGN PATENT DOCUMENTS 118453 4/1944 Australia .......................... 219/10.53

OTHER PUBLICATIONS

"The Gloss of Ultraviolet Cured Press Applied Films"; R. W. Bessemer; *Radiation Curing;* May 1976; pp. 10–16.

"UV Curing: Science and Technology"; S. Peter Pappas, Phd, Ed.; Technology Marketing Corp.; Apr. 1980.

*Primary Examiner*—C. L. Albritton
*Assistant Examiner*—M. M. Lateef
*Attorney, Agent, or Firm*—Murray, Whisenhunt & Ferguson

[57] ABSTRACT

A double-faced disk-like recording medium comprising recording layers containing a dielectric binder is supported under pressure between a pair of electrodes having highly planished surfaces, and a high frequency is applied from the electrodes to both surfaces of the medium, thereby to heat and smooth the medium surfaces.

7 Claims, 3 Drawing Figures

SURFACE SMOOTHING METHOD FOR DISK-LIKE RECORDING MEDIUM

BACKGROUND OF THE INVENTION

1. Field of the Invention

This invention relates to a method of smoothing the surfaces of a disk-like recording medium. This invention particularly relates to a method of uniformly smoothing both surfaces of a double-faced flexible recording medium.

2. Description of the Prior Art

As techniques for smoothing the surface of a magnetic recording medium, the following methods have heretofore been known widely:

(1) A method wherein the dispersant and the dispersing method used at the step of preparing a magnetic coating solution are improved to form a magnetic layer having a relatively smooth surface at the step immediately after the coating.

(2) A method wherein magnetic layers of recording media after coating and drying are contacted with each other and moved at high speeds with respect to each other to rub, grind and smooth the surfaces of the magnetic layers.

(3) A method wherein the magnetic layer surface is rubbed and ground with fur of animals, plastics, metals, ceramics, or the like.

(4) A method wherein the magnetic layer is smoothed by use of press rolls which are called the supercalender rolls.

However, the conventional methods described above present the problems as described below. Namely, in the method (1), the electromagnetic transducing characteristics, particularly the sensitivity and the signal-to-noise ratio obtained are not satisfactory. In the method (2), the drop out due to chipping of the magnetic layers by the grinding is so increased as to make it impossible to put the method into practice. In the method (3), it is impossible to conduct the surface smoothing required for a high-density recording medium. In the method (4), surface smoothing is conducted by passing a recording medium several times between a metal roll and a plastic roll. In this method, since the nip pressure of the supercalender rolls is high, large loads are exerted on the rolls and roll noise occurs when the rolls cannot withstand high pressures. Further, the middle portions of the rolls are thermally expanded due to heat generated by the rolls when they are rotated in the pressed condition and/or due to heat for raising the roll temperature to a value within the range of 40° to 80° C. for the purpose of improving the smoothing effect. In this case, the pressing force of the rolls becomes uneven and, therefore, the thickness and/or smoothness of the magnetic recording medium obtained becomes uneven. In the case of a resilient roll, the hardness of the roll becomes uneven or the roll is cracked when the condition as described above continues for long periods.

In the cases of tapes wherein only one tape side is used for recording, for example, video tapes, audio tapes, and computer tapes, the purpose of smoothing the magnetic layer surface can be accomplished by conducting calendering with the magnetic layer surface contacting the surface of the metal roll of the aforesaid supercalender rolls. Therefore, the supercalender, including various improved types, is widely used.

However, in the case of disk-like recording mediums such as floppy disks, the double-faced type is mainly used to satisfy the need for high density recording. When smoothing of the surfaces of the double-faced floppy disk is conducted by using the conventional supercalender, one surface of the double-faced floppy disk comes into contact with a resilient plastic roll. Therefore, the magnetic layer surface on the side contacting the resilient roll is not so smoothed as the magnetic layer surface on the side contacting a metal roll due to slight deflection and the surface condition of the resilient roll. As a result, many defective products exhibiting drop-out are produced.

In order to eliminate the aforesaid drawback of the supercalendering method, it has been proposed to abrade and smooth the surfaces of punched-out disks one by one by use of an abrasive. However, abrasion cannot fill in or eliminate fine gaps in the magnetic layer which are generated at the coating step and which cause drop-out or deteriorate the electromagnetic transducing characteristics. On the other hand, by the supercalendering, since the magnetic layer is pressed, it is possible to fill in the fine gaps in the magnetic layer.

SUMMARY OF THE INVENTION

The primary object of the present invention is to provide a smoothing method which can uniformly smooth both surfaces of a double-faced flexible recording medium.

Another object of the present invention is to provide a smoothing method which can fill in fine gaps in the magnetic layers of a double-faced flexible recording medium.

The smoothing method in accordance with the present invention comprises interposing and supporting a disk-like recording medium under pressure between a pair of high-frequency dielectric heating electrodes having highly planished surfaces, applying a high frequency from said electrodes to said recording medium, thereby smoothing the magnetic layers on the surfaces of said recording medium.

The present invention will hereinbelow be described in further detail with reference to the accompanying drawings.

DETAILED DESCRIPTION OF THE INVENTION

Recently, flexible magnetic recording media are formed by applying a mixture of a magnetic material and a binder to a plastic film (substrate), and drying the mixture to form a magnetic layer. As the magnetic material, a ferromagnetic material such as γ-Fe₂O₃, Fe₃O₄, Co-doped γ-Fe₂O₃, Co-doped Fe₃O₄, or CrO₂ is used. As the binder, there may be used, for example, a vinyl chloride-vinyl acetate copolymer, a vinyl chloride-acrylonitrile copolymer, an acrylic ester-acrylonitrile copolymer, an acrylic estervinylidene chloride copolymer, other types of acrylic acid copolymers, a urethane elastomer, a nylon-silicone resin, nitrocellulose, a polyvinyl chloride, a vinylidene chloride-acrylonitrile copolymer, a polyamide resin, a polyvinyl butyral, a cellulose derivative, a styrene-butadiene copolymer, a phenol resin, an epoxy resin, a polyurethane, a urea resin, a melamine resin, a polyester resin, a chlorovinyl ether-acrylate copolymer, a methacrylate copolymer-diisocyanate blend polymer, an amino resin, various types of synthetic rubber, or the like.

As the method of applying the magnetic coating solution, top reverse coating, bottom reverse coating, doctor coating, gravure coating, spray coating, or the like may be used. The substrate may, for example, be a non-magnetic polyethylene terephthalate film, a triacetyl cellulose film, a diacetyl cellulose film, a vinylidene chloride film, a polypropylene film, the Q Film (brand name of Teijin, Limited, in Japan) containing polyethylene naphthalate as the main ingredient, or the like. The polyethylene terephthalate film is used most widely. The thickness of the medium is, in general, within the range of 4μ to 150μ. In the case of a floppy disk, the thickness of the medium should preferably be within the range of 20μ to 150μ. The magnetic coating solution applied to the substrate is dried at a temperature of about 100° C. for several minutes. In the present invention, after the magnetic recording medium is prepared as described above, the dielectric resin used as the binder in the magnetic recording medium is heated and softened by the high-frequency dielectric heating method. Then, the magnetic recording medium is pressed and smoothed between a pair of highly planished flat plates. The frequency used for the high-frequency dielectric heating is within the range of several kilohertz to several thousands of megahertz, and the most preferable frequency range is from several megahertz to several hundreds of megahertz.

Figure 1:
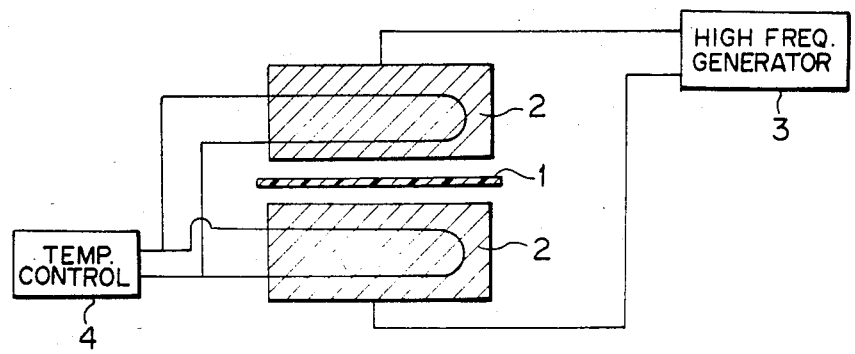
FIG. 1 is a schematic view showing an embodiment of the apparatus for carrying out the smoothing method in accordance with the present invention, wherein the surfaces of the electrodes on the side contacting a recording medium are constituted of flat metal plates having highly planished surfaces.
Figure 2:
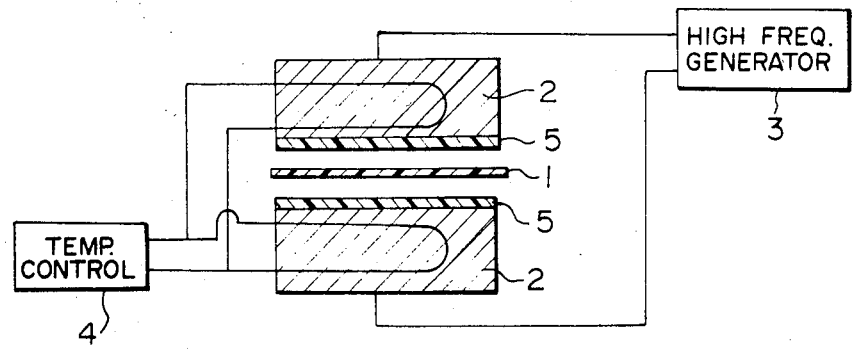
FIG. 2 is a schematic view showing another embodiment of the apparatus for carrying out the smoothing method in accordance with the present invention, wherein the surfaces of the electrodes on the side contacting a recording medium are provided with planished flat plastic plates.
Figure 3:
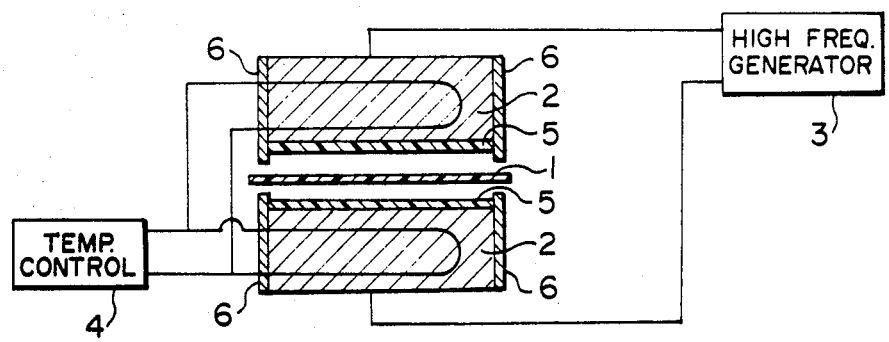
FIG. 3 is a schematic view showing a further embodiment of the apparatus for carrying out the smoothing method in accordance with the present invention, wherein a punching means is provided.

FIGS. 1 to 3 show various embodiments of the apparatus for carrying out the smoothing method in accordance with the present invention. In FIG. 1, a disk-like recording medium 1 is supported under pressure between a pair of electrodes 2, 2 having their surfaces highly planished. A high frequency is applied from a high-frequency generator 3 to the electrodes 2, 2 to heat and soften the binder used in the medium 1 by the high-frequency dielectric heating method. The electrodes 2, 2 are connected to a temperature regulator 4 for controlling the temperature of the electrodes 2, 2.

In FIG. 2, electrodes 2, 2 are provided with planished plastic plates 5, 5 which support the recording medium 1 therebetween under pressure.

In FIG. 3, the side faces of electrodes 2, 2 are provided with punching devices 6, 6 for punching out the smoothed recording medium to predetermined dimensions.

The smoothing method in accordance with the present invention utilizing high-frequency heating has various advantages as described below over the external heating method used in the conventional supercalender wherein metal rolls are heated electrically or with hot water to heat a medium:

(1) Heating is conducted uniformly since the heat is generated by the molecules within the dielectric binder.

(2) Since heat is internally generated in the medium, temperature unevenness in the thickness direction of the medium does not occur as it does in the case of the conventional external heating as described above. (In the conventional external heating, the surface of the medium becomes hot, but the inside of the medium does not.)

(3) The temperature of the medium rises quickly, and the rate of temperature rise can be controlled as desired.

(4) When the material to be heated is a composite material comprising materials exhibiting dielectric constants or power factors different from each other, it is possible to selectively heat the material. In the magnetic recording medium, the polyethylene terephthalate film used as the substrate is not heated, and only the magnetic layer can be heated.

(5) The apparatus is inexpensive compared with other external heating systems.

(6) Smoothing can be conducted at a pressure lower than the roll pressure used in conventional calendering. The smoothing method in accordance with the present invention having the advantages as described above is suitable particularly for smoothing the surfaces of a double-faced medium such as a floppy disk.

The material that can be heated by the dielectric heating at a frequency within the aforesaid range is mainly the binder used in the magnetic layer. As is well known, the dielectric constant and the dielectric power factor of the dielectric substance are the important factors in heating, and the amount of heat generated (P) can be represented by the formula of $$P = k \times f \times \epsilon \times E^2 \times \tan \delta \times 10^{-12} (W/cm^3)$$

wherein k designates the coefficient, f denotes the frequency applied, $\epsilon$ designates the dielectric constant, E denotes the intensity of electric field, and tan $\delta$ denotes the dielectric power factor.

Among the aforesaid binder materials used in the magnetic layer, vinyl chloride, vinyl chloride-vinyl acetate, vinylidene chloride, urethane and polyamide compounds are readily heated by dielectric heating. Particularly, vinylchloride, vinyl chloride-vinyl acetate and vinylidene chloride compounds are very readily heated by dielectric heating. The electrodes having the highly planished surfaces may be constituted of a surface-polished metal or of a metal plating, or may be constituted by forming flat plastic plates or films on metal surfaces. Further, temperature regulators may be positioned within the respective electrodes. The plates or films laid on the electrodes may be made of a silicone resin, a glass fiber-containing silicone resin, a polyester resin, a glass fiber-containing polyester resin, an FRP, ethylene tetrafluoride (Teflon), a varnish-containing cotton cloth, a phenol resin (Bakelite), asbestos, cellophane, mica, glass, or the like.

The present invention will further be illustrated by the following nonlimitative example.

TABLE 1

| Composition | Parts by weight |
| --- | --- |
| γ-Fe₂O₃ (0.4 × 0.07 × 0.07μ) | 300 |
| Vinyl chloride-vinyl acetate resin | 50 |
| Urethane resin | 30 |
| Plasticizer (Triphenylphosphate) | 5 |

TABLE 1-continued

| Composition | Parts by weight |
|---|---|
| MEK: toluene (4:6) | 900 |

A coating solution was prepared by dispersing the composition as shown in Table 1 for 48 hours in a ball mill. Then, the coating solution was applied to both sides of a 75μ-thick polyethylene terephthalate film so as to obtain a dry coating thickness of 3μ. In this manner, a bulk roll was obtained. Half of the obtained bulk roll was processed in a conventional supercalender (metal roll temperature: 60° C., linear pressure: 300 kg/cm$^2$). The remaining half of the bulk roll was processed by the smoothing method in accordance with the present invention. In the high-frequency dielectric heating apparatus, the output was 4 kW, the frequency was 45 MHz, and a pair of electrodes were connected to a temperature regulator and maintained at a temperature within the range of 33°±4° C. On the electrode surfaces were laid flat silicone plates having smoothly abraded surfaces. The pressure was 2 kg/cm$^2$, and the high-frequency application time was one second. The disk-like medium had a diameter of 8".

The glossiness under 45° exposure was measured according to JIS Z 8741, and the surface smoothness of the samples was compared. (The 45° glossiness when black glass having a refractive index of 1.56 was used was taken to be 98.3 as the reference glossiness.) Further, drop-out inspection was conducted, and the yield was calculated. Table 2 shows the glossinesses measured, and Table 3 shows the yields measured.

TABLE 2

| | Conventional calendering | Method of the present invention |
|---|---|---|
| Face 0 (metal roll side) | 70 | 75 |
| Face 1 (plastic roll side) | 45 | 75 |

TABLE 3

| | Conventional calendering | Method of the present invention |
|---|---|---|
| Face 0 | 85% | 95% |
| Face 1 | 55% | 98% |

I claim:
1. A method of smoothing the surfaces of a disk-like recording medium having a dielectric binder, which comprises interposing and supporting the disk-like recording medium under pressure between a pair of electrodes having highly planished surfaces, and applying a high frequency from said electrodes to both surfaces of said medium so as to soften the dielectric binder, thereby smoothing the surfaces of said medium.
2. A method as defined in claim 1 wherein said high frequency is within the range of several kilohertz to several thousands of megahertz.
3. A method as defined in claim 1 wherein the surfaces of said electrodes are made of a metal.
4. A method as defined in claim 1 wherein said electrodes comprises metal surfaces and resilient layers laid on said metal surfaces.
5. A method as defined in claim 4 wherein said resilient layers are made of plastics.
6. A method as defined in claim 1 wherein said electrodes are connected to a temperature regulator for controlling the temperature of said electrodes.
7. A method as defined in claim 1 wherein side faces of said electrodes are provided with a punching means for punching out said recording medium after smoothing.

* * * * *